UNITED STATES PATENT OFFICE.

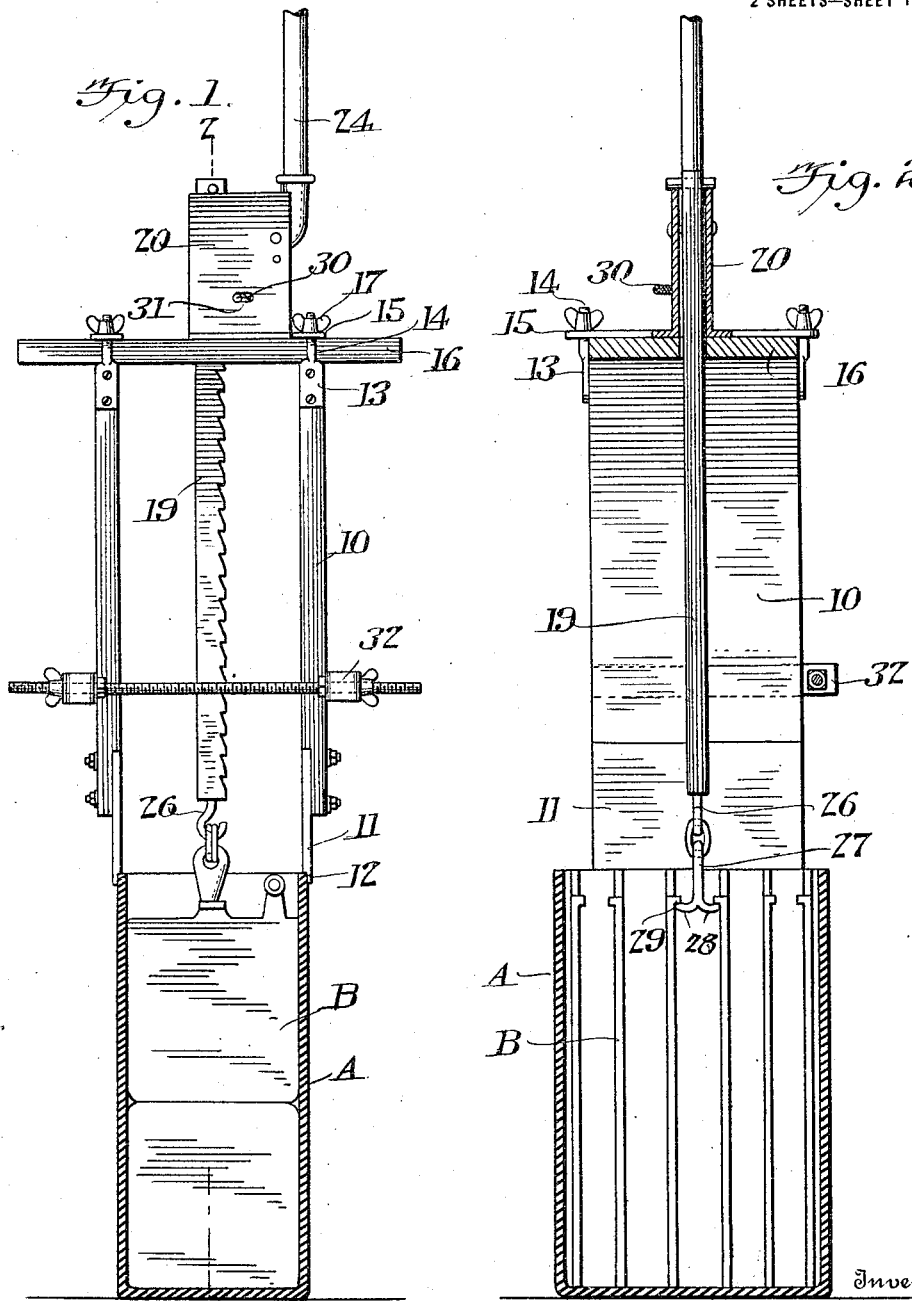

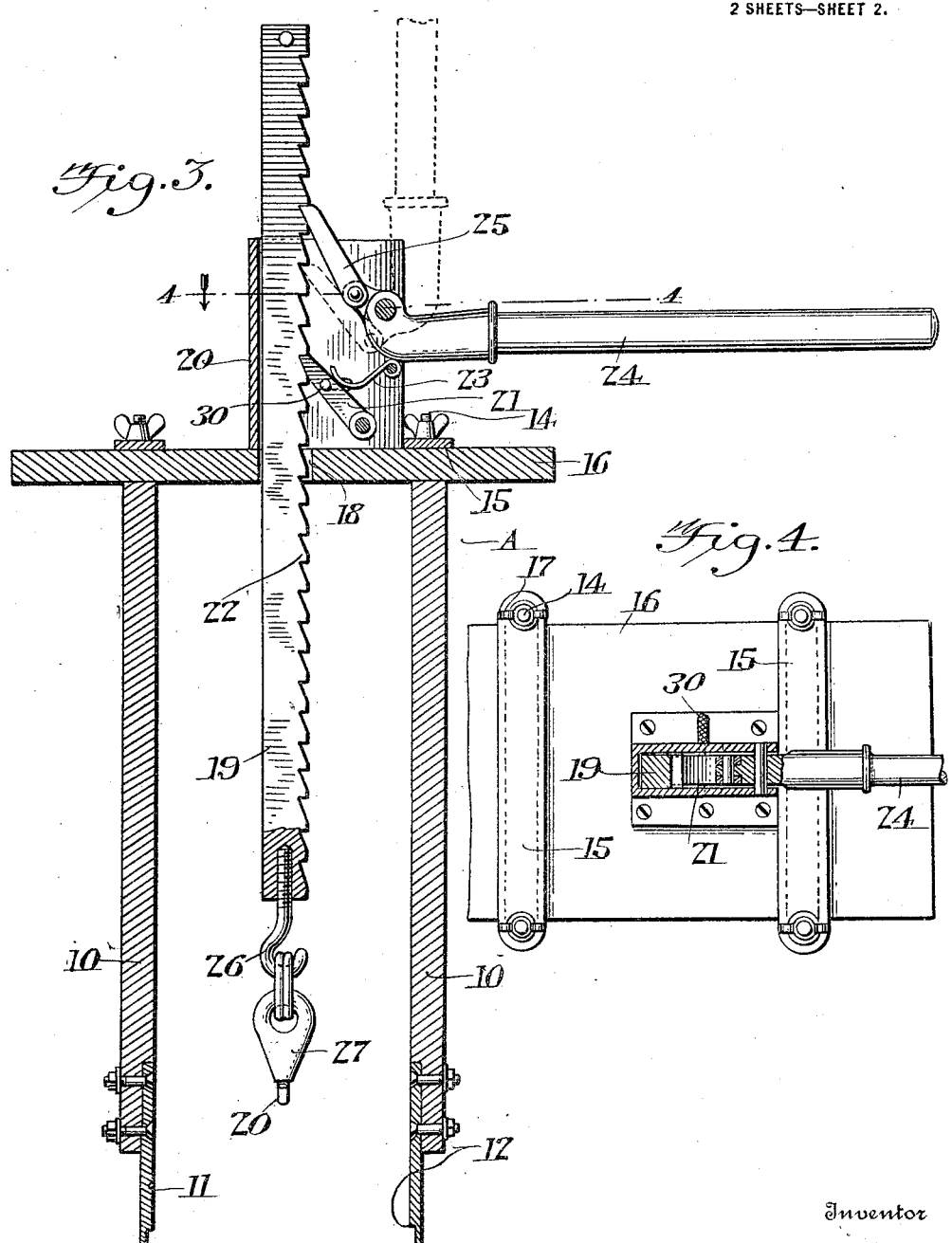

ROBERT F. ROBERTSON, OF PHILADELPHIA, PENNSYLVANIA.

PLATE-REMOVER FOR STORAGE BATTERIES.

1,230,786.  Specification of Letters Patent.  Patented June 19, 1917.

Application filed May 1, 1915. Serial No. 25,271.

*To all whom it may concern:*

Be it known that I, ROBERT F. ROBERTSON, a citizen of the United States, residing at Philadelphia, in the county of Philadelphia and State of Pennsylvania, have invented new and useful Improvements in Plate-Removers for Storage Batteries, of which the following is a specification.

The invention relates to a device for removing electrodes or plates from storage batteries.

The primary object of the invention is the provision of a device of this character wherein the electrodes or plates of a storage battery can be readily and conveniently removed from the cell or casing without requiring the manual removal thereof, thereby obviating possibility of serious injury to the hands or damage to the various elements in the make-up of the storage battery.

Another object of the invention is the provision of a device of this character wherein the electrodes or plates can be quickly removed by a single person and without fear of injury to the batteries, the device being of novel form and is capable of adjustment so as to fit various sizes of battery casings or cells.

A further object of the invention is the provision of a device of this character wherein the construction thereof permits the collapsing of the same to facilitate the transportation thereof from one point to anther, or the convenient carriage thereof.

A further object of the invention is the provision of a device of this character which is simple in construction, reliable and efficient in operation, strong, durable, and inexpensive in manufacture.

With these and other objects in view, the invention consists in the construction, combination and arrangement of parts as will be hereinafter fully described, illustrated in the accompanying drawings, and pointed out in the claims hereunto appended.

In the drawings:—

Figure 1 is a vertical longitudinal sectional view through the cell or casing of a storage battery showing the device constructed in accordance with the invention applied thereto.

Fig. 2 is a sectional view on the line 2—2 of Fig. 1.

Fig. 3 is an enlarged vertical longitudinal sectional view through the device detached from the battery cell or casing.

Fig. 4 is a sectional view on the line 4—4 of Fig. 3, looking in the direction of the arrow.

Similar reference characters indicate corresponding parts throughout the several views in the drawings.

Referring to the drawings in detail, A designates a portion of the cell or casing of a storage battery, having therein the usual electrodes or plates B, and adapted to be mounted on the cell or casing A is the device hereinafter fully described.

The device comprises a pair of spaced parallel or vertically disposed uprights 10, to the lower ends of which are bolted or otherwise secured clamping jaws 11 which are provided with notches 12 to accommodate the upper outside edges of opposite sides of the cell or casing A, while at the opposite ends of the uprights are secured the flattened portions 13 of clamping bolts 14 on which are engaged clamping rails or bars 15 which are adapted to bridge a platform 16 which is superimposed upon the upper ends of the said uprights 10, the bolts being fitted with winged nuts 17 for the secure fastening of the platform in proper position upon the uprights.

Slidable through a suitable opening 18 centrally of the platform 16 is a lifting rack bar 19, the same working through a housing 20 fixed to and rising from the said platform. Pivoted within the housing is a holding pawl or dog 21 which engages the teeth 22 on the rack bar 19 for locking the same against movement in one direction, the pawl or dog 21 being held in positive locking relation to the teeth 22 through the medium of a leaf spring 23 suitably mounted within the housing.

Pivoted for swinging movement in the housing is an operating or jack arm 24 to which is eccentrically pivoted a lifting pawl or dog 25 which engages with the teeth 22 of the lifting bar 19 to move the same in one direction on actuating the operating or jack arm for the raising of the lifting bar.

Mounted in the lower end of the lifting bar 19 is a hook-like hanger 26 on which is detachably connected a duplex anchor member 27, the bills 28 of which are adapted to engage lateral ledges or nibs 29 formed on the electrodes or plates B at the upper ends thereof, so that on the raising of the lifting bar 19 the said electrodes or plates B can be extracted from the cell or casing A without disturbing or seriously damaging the various elements that constitute a storage battery.

The holding dog 21 is provided with a finger engaging pin 30 which works in and projects through a slot 31 in the housing 20 without the same so that the dog or pawl 21 can be manually released or disengaged from the teeth 22 of the lifting bar 19 to permit the lowering thereof or free movement of the same in either direction, it being understood of course that the lifting pawl or dog 25 is thrown out of positive engagement therewith when this is to be accomplished.

Engaged with the uprights 10 is an adjustable clamping device 32 which serves to bring the clamping jaws 11 into engagement with the cell or casing A for the firm fastening of the support thereon, and also permits the adjustment of the support so that it will fit various sizes of cells or casings for storage batteries.

From the foregoing description, taken in connection with the accompanying drawing, the construction and manner of operation of the device will be clearly understood, and therefore a more extended explanation has been omitted.

What is claimed is:—

1. In combination with a device for removing plates from batteries, supports therefor having surfaces thereon for engagement with the upper edges of a battery casing and having surfaces thereon for engagement with the outer surfaces of the casing, and means for adjusting the supports laterally respecting each other whereby the device may be adjusted to fit different sizes of battery casings.

2. In combination with a device for removing plates from batteries, supports therefor having surfaces thereon for engagement with the upper edges of a battery casing and having surfaces thereon for engagement with the outer surfaces of the casing, and means for adjusting the supports laterally respecting each other and located without the plane of a battery plate in position to be lifted.

In testimony whereof I affix my signature.

ROBERT F. ROBERTSON.

Copies of this patent may be obtained for five cents each, by addressing the "Commissioner of Patents, Washington, D. C."